(12) United States Patent
Wang

(10) Patent No.: US 12,378,399 B1
(45) Date of Patent: Aug. 5, 2025

(54) SYNTHETIC RUBBER COMPOSITION FOR SOLID MOLDS

(71) Applicant: Jeffrey Wang, Los Angeles, CA (US)

(72) Inventor: Jeffrey Wang, Los Angeles, CA (US)

( * ) Notice: Subject to any disclaimer, the term of this patent is extended or adjusted under 35 U.S.C. 154(b) by 641 days.

(21) Appl. No.: 17/023,329

(22) Filed: Sep. 16, 2020

(51) Int. Cl.
| | |
|---|---|
| *C08L 33/08* | (2006.01) |
| *B29C 45/00* | (2006.01) |
| *B29C 45/27* | (2006.01) |
| *B29C 45/32* | (2006.01) |
| *C08L 1/02* | (2006.01) |
| *C08L 5/00* | (2006.01) |
| *C08L 33/10* | (2006.01) |
| *B29K 1/00* | (2006.01) |
| *B29K 33/00* | (2006.01) |

(52) U.S. Cl.
CPC .......... *C08L 33/08* (2013.01); *B29C 45/0001* (2013.01); *B29C 45/2708* (2013.01); *B29C 45/32* (2013.01); *C08L 1/02* (2013.01); *C08L 5/00* (2013.01); *C08L 33/10* (2013.01); *B29K 2001/08* (2013.01); *B29K 2005/00* (2013.01); *B29K 2033/08* (2013.01); *C08L 2312/00* (2013.01)

(58) Field of Classification Search
CPC .... C08L 33/08; C08L 1/02; C08L 5/00; C08L 33/10; C08L 2312/00; B29C 45/0001; B29C 45/2708; B29C 45/32; B29K 2001/08; B29K 2005/00; B29K 2033/08
USPC .......................................... 524/733
See application file for complete search history.

(56) References Cited

U.S. PATENT DOCUMENTS

2019/0269604 A1\* 9/2019 Kim .................. A61K 8/585
2022/0098346 A1\* 3/2022 Shaw .................. C08J 5/18

\* cited by examiner

*Primary Examiner* — Jiangtian Xu
(74) *Attorney, Agent, or Firm* — Michael D Eisenberg; A. Imtiaz Billah

(57) ABSTRACT

The compositions herein are directed to a rubber composition, which contains a polymer crosslinked with methacrylate and polyacrylate, a polysaccharide or gum, and a cellulose base for filling molds.

10 Claims, 7 Drawing Sheets

Inset A

Inset B

Inset C

Inset D

Inset A  Inset B

SYNTHETIC RUBBER COMPOSITION FOR SOLID MOLDS

FIELD OF INVENTION

The present invention relates to rubber compositions with stiff or elastic properties and methods for producing rubber compositions.

BACKGROUND OF THE INVENTION

Industrial positive displacement pumps are used in obtaining shaving cream and other rubber-based consumer products. The pump is used in a reverse mode to test induction/pumping in raw materials into a main kettle from a side vessel drum with premixed materials. However, materials in the side vessel drum become coagulated and thickened. This makes the pumping of this material into the main kettle difficult or intractable. When the forward modes and subsequent reserve modes are implemented, the coagulation and thickening of the material is intractable as to jam the pump. Stated another way, the pump is jammed. Thereby, the flow of materials between the drum and main kettle is blocked.

What is needed is materials (e.g., plastics and elastomers) amenable to premixing such that there is a flow of materials between the drum and main kettle while yielding products that exhibit stiff, soft, and/or elastic properties, which can form different shapes.

BRIEF SUMMARY OF EMBODIMENTS OF THE INVENTION

In a variant, a composition includes: polyacrylate; polymethacrylate; a branched polysaccharide; a linear cellulose; and a solubilizer. The polyacrylate, the polymethacrylate, the branched polysaccharide; the linear cellulose, and the solubilizer are combined to form a rubber.

In another variant, the solubilizer includes at least one of: glycerin and water.

In a further variant, the rubber comprises molds.

In another further variant, the polyacrylate and polymethacrylate derive from Acrylate/C10-30 Alkyl Acrylate Crosspolymer.

In yet another further variant, the branched polysaccharide comprises at least one of: guar gum, xanthan gum, Carrageenan, and locust gum.

In yet another further variant, the linear cellulose comprises at least of: hydroxylethylcellulose, hydroxymethylcellulose, and cellulose.

In yet another further variant, the polyacrylate and polymethacrylate are present in an amount of 5% by weight, the branched polysaccharide is present in amount of 10% by weight, the solvent is present in an amount of 70% by weight, the linear cellulose is present in an amount of 15% by weight.

In yet another further variant, the polyacrylate and polymethacrylate are present in an amount of 5% by weight, the branched polysaccharide is present in amount of 12% by weight, the solvent is present in an amount of 68% by weight, the linear cellulose is present in an amount of 15% by weight.

In yet another further variant, the rubber is processed from 85° C.-150° C.

In a variant, a composition includes: a combination of aloe vera and stearyl alcohol; a branched polysaccharide; a linear cellulose; and solubilizer. The combination, the branched polysaccharide; the linear cellulose, and the solvent are combined to form a rubber.

In another variant, the solubilizer includes at least one of: glycerin and water.

In a further variant, the branched polysaccharide includes at least one of: guar gum, xanthan gum, Carrageenan, and locust gum.

In another further variant, the linear cellulose includes at least one of: hydroxylethylcellulose, hydroxymethylcellulose, and cellulose.

In yet another further variant, the combination is present in an amount of 30% by weight, the branched polysaccharide is present in amount of 12% by weight, the solvent is present in an amount of 43% by weight, the linear cellulose is present in an amount of 15% by weight.

In yet another further variant, the rubber is processed from 85° C.-150° C.

In a variant, a method includes: feeding a combination into an injection mold, wherein the combination comprises a polyacrylate, a polymethacrylate, a branched polysaccharide, a linear cellulose, and a solubilizer; and heating the composition between 85° C.-150° C. in response to feeding the combination into the injection mold. The injection molder includes a top plate, a middle plate, a bottom plate, a nozzle bushing, a plurality of cavities, a plurality of slots, a plurality of dowel pins and bushings; a plurality of trim gates; and a plurality of sprues.

In another variant, the plurality of sprues extends into the middle plate.

In yet another variant, the plurality of dowel pins and bushings reside within the middle plate and the bottom plate.

In a further embodiment, the plurality of cavities and the plurality of trim gates reside within the bottom plate.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

DETAILED DESCRIPTION OF THE EMBODIMENTS OF THE INVENTION

The compositions herein are directed to rubbers for rubbers and elastomers and methods for producing rubbers for rubbers and elastomers. Components of the compositions herein are premixed and charged into a pump which undergoes a first reverse mode, a first forward mode, and a second reverse mode. In the first reverse mode, the components of the compositions herein from a side vessel drum are transferred to a main kettle of an industrial pump. The components of the composition herein are coagulated and thickened, thereby introducing difficulty in transferring the mixed components from the side vessel drum to the main kettle. In contrast to other compositions, intractability of the mixed components of the compositions herein is removed when the pump is placed in the first forward position as to pump the premixed components of the compositions herein out of main kettle back into the side vessel drum. Upon the components of the compositions herein reaching the side vessel drum, the components of the compositions herein inside vessel drum soften up (lower the viscosity). Then the pump is set to the second reverse mode to induct and pump material from the drum (mixed with main kettle materials) into the main kettle. The pump did not jam and a rubber for rubbers and elastomers is formed in the main kettle.

Figure 1:
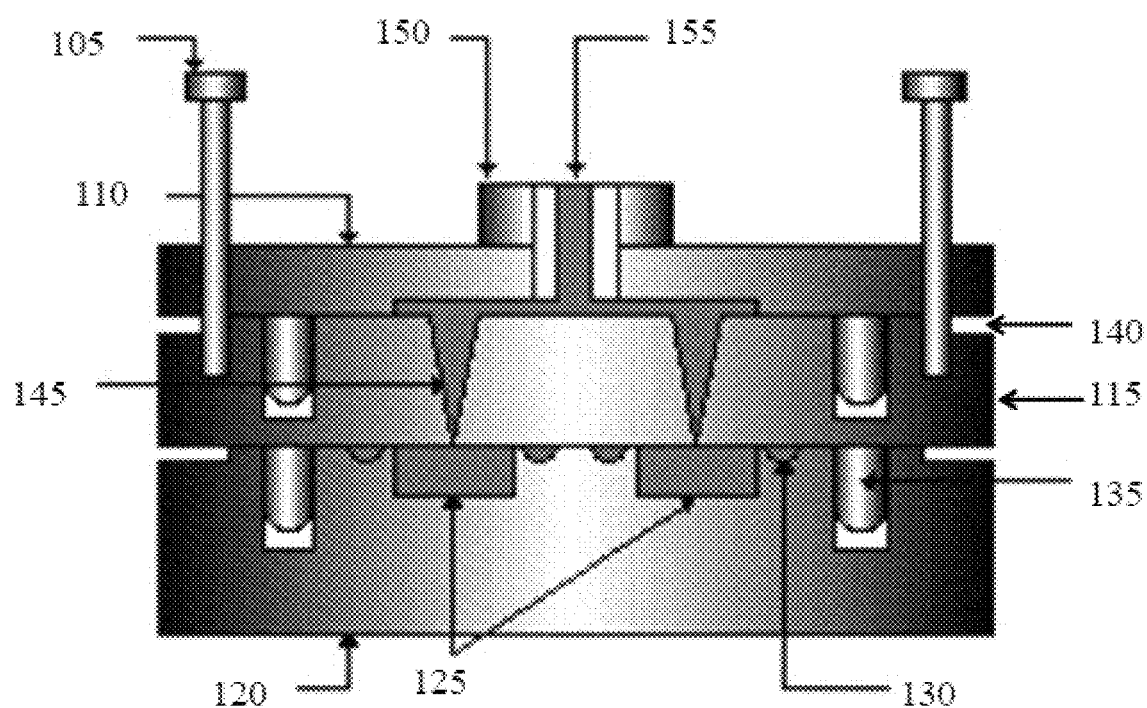
FIG. 1 is a depiction of a vertical type injection mold for obtaining the rubbers herein.

Referring to FIG. 1, a vertical type injection mold is depicted for curing premixed components of the compositions herein. The components of the compositions herein are exposed to high temperatures and pressures, thus curing (i.e., crosslinking) the components of the compositions herein to yield rubbers. Injection cull and runner 155 (i.e., the disc of material that is left to cure in the transfer pot after the cavities have been filled) is surrounded by nozzle bushing 150, which resides directly above top plate 110. The premixed components of the compositions herein are charged into injection cull and runner 155, which is connected to sprues 145 (i.e., the slug formed in the orifice of the sprue bushing connecting the orifices of nozzle bushing 150 to the runners in the mold). Sprues 145 extends from the top plate 110 into middle plate 115 and connects to cavities 125 (i.e., mechanical component for forming the outer surface of the molded part). Flash and tear trim gates 130 (i.e., a small restricted opening or channel between the end of the runner where the mixed component of the compositions enter cavity 125 in a transfer or injection mold) reside in bottom plate 120. Opening bar slots 140 reside in top portions of middle plate 115 and bottom plate 120 for alleviating pressure build up by expelling volatiles from the vertical type injection mold. Dowel Pin and bushing 135 allows for the plates to be in sync with each other. Top plate 110 and bottom plate 120 are: (i) heated and (ii) placed in contact with the compositions herein (components in the pre-mixed state and post-mixed state). Hold times (length of heating time the components are in contact with the top plate 110 and bottom plate 120) are controlled by the vertical type injection mold. The compositions herein fill cavities 125 or shape of disks, bills, irregular shapes, ovals, etc. of the rubber. Top plate 110 and bottom plate 120 are separated from each other to allow for the rubber to cool down.

Figure 2:
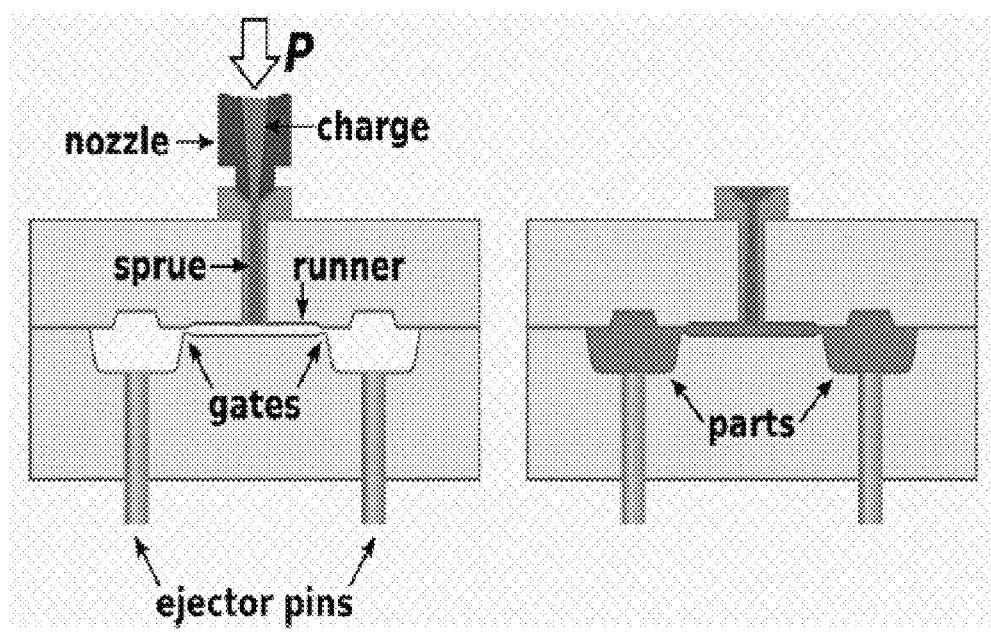
FIG. 2 is a depiction of a portion of the vertical type injection mold where the premixed components of the compositions herein are transported.
Figure 3:
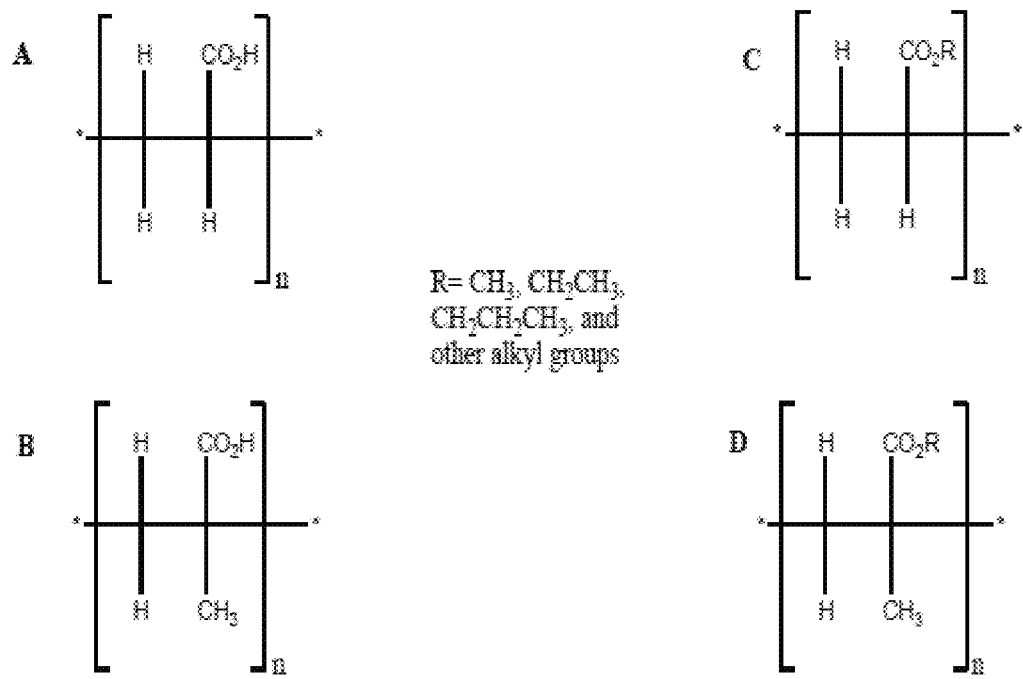
FIG. 3 is a depiction of carboxyl acid or ester containing polymer structures.

Referring to FIG. 2, the premixed components of Compositions A, B, C, and D are charged into the depicted nozzle. The sprue conduits the charged contents from the nozzle to the runner, which connects the cavities to each other. The charged contents can enter into or be block from the cavities via gates. Ejector pins can press against contents in the left cavity to force transport of the contents through the gates and runner to the right cavity (or vice versa). In an embodiment, polyacrylic acid polymers (e.g., C10-C30 acrylates co-polymer); polysaccharides (e.g., guar or Xanthan gum); and hydroxyethylcellulose or cellulose derivatives are premixed and subjected to forward and reverse flows. The forward and reverse flows occur between 85° C. to 150° C. into molds via batch processing to yield the compositions herein for rubbers. Alternatively using an injection mold process (as depicted in FIGS. 1 and 2) compositional production can be flowed through at operating pressures and temperatures ranging from 175° C. to 230° C. and set into the mold with top and bottom plate pieces, with ejector pins. The rubbers are rubbers/elastomers that can be used to make, but not are limited to, spatulas, shoes, and children toys Compositions A-D may each be composed of a cellulose base, solubilizer, and supplementary polysaccharides, or clays, and non-ionic fatty alcohols.

The cellulose base is cellulosic (i.e., a linear polysaccharide of 100 to 1000β (1→4) linked D-glucose units) or derivatives of cellulose such as cellulose ethers and cellulose esters. Examples of cellulose ethers include: methylcellulose (E number: E461), ethylcellulose (E number: E462), ethyl methyl cellulose (E number: E465), hydroxyethyl cellulose, hydroxypropyl cellulose (HPC, E number: E463), hydroxypropyl methyl cellulose (HMPC, E number: 464), ethyl hydroxyethyl cellulose (E number: E467), and carboxyalkyl cellulose (CMC, E number: E466). Examples of cellulose esters include: cellulose acetate, cellulose triacetate, cellulose propionate, cellulose acetate propionate, cellulose acetate butyrate, cellulose nitrate, and cellulose sulfate.

The solubilizer is a liquid solvent for putting the other components of the compositions A-D into a solution phase. Examples of solubilizers include one or more of glycerin (i.e., propane-1,2,3-triol), de-ionized water, simple alcohols (i.e., methanol, ethanol, 1-propanol, 2-propanol, and so forth), nitriles, di-alcohols, and acetones.

The supplementary polysaccharides may be linear polysaccharides and exo-polysaccharides which are arabinoxylan, chitin, or pectin based. A preferred linear polysaccharide for the compositions herein includes Carrageenan (i.e., high-molecular-weight polysaccharides made up of repeating galactose units and 3,6-anhydrogalactose (3,6-AG), both sulfated and non-sulfated, joined by alternating α-1,3 and β-1,4-glycosidic linkages). Exo-polysaccharides contain monosaccharide units or other groups which are side-branches connected to the main linear branch. Examples of exo-polysaccharides include guar gum (CAS Number 900-30-0) and Xanthan gum (CAS Number 11138-66-2).

Each of compositions A-D may have a rubberizing agent which imparts elastomeric properties to the rubber, wherein the rubberizing agent is Xanthan gum, guar gum, carrageenan gum. Additional texturing agent include polymethylacrylic polymers (i.e., poly(1-methylprop-1-enoic acid), polyacrylic polymers (i.e., carbomers), a combination of polymethylacrylic and polyacrylic polymers (e.g., Acrylate/C10-30 Alkyl Acrylate Crosspolymer); aloe vera (i.e., a succulent plant species of the genus *Aloe*) and stearyl alcohol (i.e., octadecan-1-ol). The compositions herein contain a mixture of polymers resembling structures A and B. In other embodiments, the compositions may also contain polymers resembling structures C and D.

| Composition A | | | |
|---|---|---|---|
| Ingredient Name | Weight % | Melting Point/ Decomposition Temp | Molecular Weight |
| Acrylate/C10-30 Alkyl Acrylate Crosspolymer | 5.00 | 400° C. | 201.24 g/mol |
| Guar Gum/Xanthan Gum/Carrageenan | 10.00 | | Xanthan: 0.69-1.37 * 10 ˆ 6 g/mol Guar: 967,000 g/mol Carrageenan (Kappap): 788.7 g/mol |
| Glycerin | 70.00 | 370° C. | 92.09 g/mol |
| Hydroxyethylcellulose | 15.00 | | 806 g/mol |
| TOTAL | 100.00 | | |

| Composition B | | | |
|---|---|---|---|
| Ingredient Name | Weight % | Melting Point/ Decomposition Temp | Molecular Weight |
| Aloe Vera + stearyl alcohol | 30.00 | | Stearyl alcohol: 270.49 g/mol |
| Guar Gum/Xanthan Gum/Carrageenan | 12.00 | | Xanthan: 0.69-1.37 * 10 ˆ 6 g/mol Guar: 967,000 g/mol Carrageenan (Kappa): 788.7 g/mol |
| Glycerin | 43.00 | 370° C. | 92.09 g/mol |
| Hydroxyethylcellulose | 15.00 | | 806 g/mol |
| TOTAL | 100.00 | | |

| Composition C | | | |
|---|---|---|---|
| Ingredient Name | Weight % | Melting Point/ Decomposition Temp | Molecular Weight |
| Acrylate/C10-30 Alkyl Acrylate Crosspolymer | 5.00 | 400° C. | 201.24 g/mol |
| Guar Gum/Xanthan Gum/Carrageenan | 12.00 | | Xanthan: 0.69-1.37 * 10 ˆ 6 g/mol Guar: 967,000 g/mol Carrageenan (Kappa): 788.7 g/mol |
| Glycerin | 30.00 | 370° C. | 92.09 g/mol |
| Hydroxyethylcellulose | 15.00 | | 806 g/mol |
| Deionized Water | 38.00 | | 18 g/mol |
| TOTAL | 100.00 | | |

| Composition D | | | |
|---|---|---|---|
| Ingredient Name | Weight % | Melting Point/ Decomposition Temp | Molecular Weight |
| Glycerin | 50.00 | 370° C. | 92.09 g/mol |
| Guar Gum/Xanthan Gum/Carrageenan | 25.00 | | Xanthan: 0.69-1.37 * 10 ˆ 6 g/mol Guar: 967,000 g/mol Carrageenan (Kappa): 788.7 g/mol |
| Hydroxyethylcellulose | 25.00 | | 806 g/mol |
| TOTAL | 100.00 | | |

EXAMPLES

Small reactors and mixing kettles are preset to temperature. Connection to vacuum pumps remove air and pressurize vessel if needed. The components of the compositions herein (e.g., Compositions A-D) are mixed together with a marine propeller or disk blade. Subsequently, an oven like Panini like press can be used with the components of the compositions herein (e.g., Compositions A-D). Subsequently and alternatively, two press pieces heat up with the right shape to produce the rubbers described above. Shapes can be molded with a top and bottom that are heat-labile, thereby yielding rubber like rubbers.

Example 1

Figure 4:
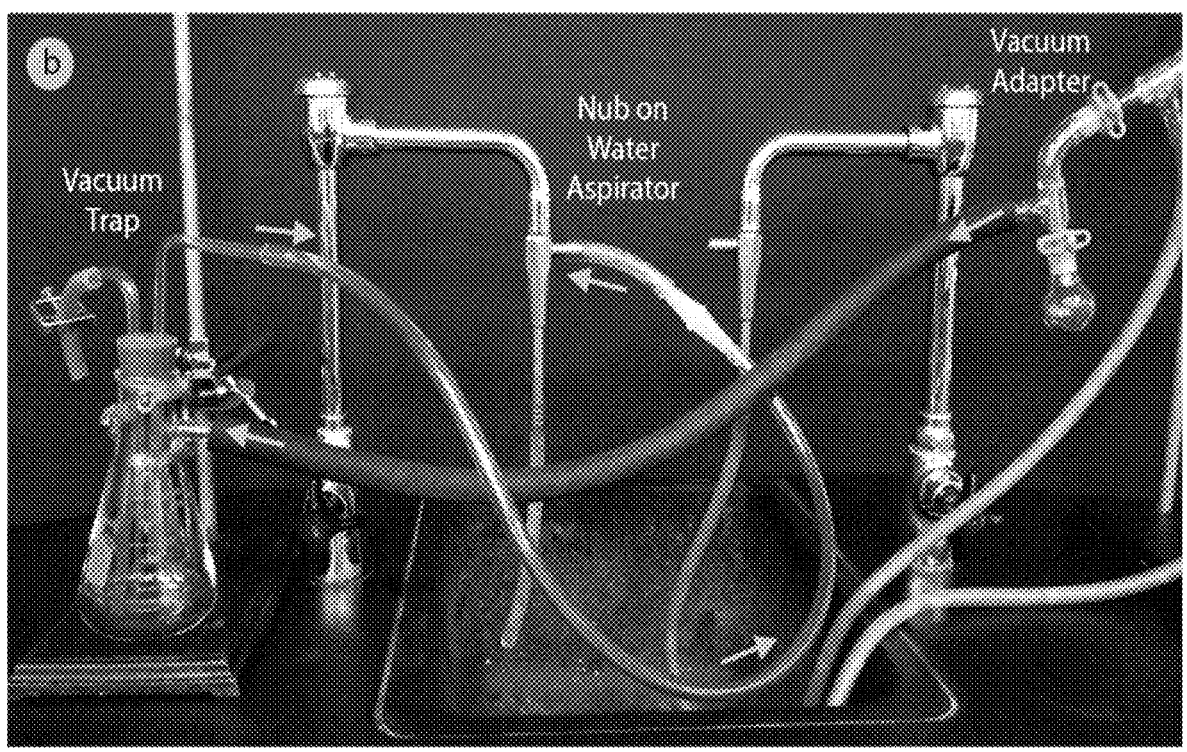
FIG. 4 is a depiction of a vacuum apparatus for obtaining the mixture of the components for treatment by a vertical type injection mold.
Figure 5:
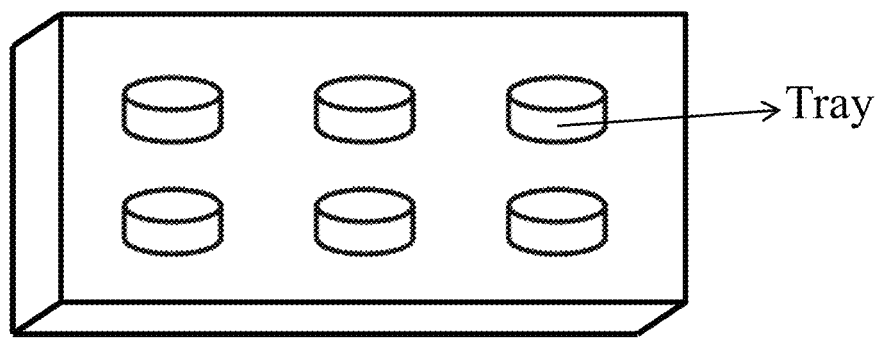
FIG. 5 is a depiction of a SS314/316 tray.

The components of compositions A-D are mixed, heat, and collected using a vacuum device, in which a negative pressure is generated using a vacuum trap and set up with a water aspirator (see FIG. 4). The collected mixture is further processed using a thermally insulated chamber for heating set to 175° C. for 10 minutes or alternatively set to 230° C. for 5 minutes or used at 150° C. for 20 in stainless steel 314/316 molds (see FIG. 5). Molds correspond to trays with recessed shapes inside (ovals, spheres, cubes, etc.) and placed into thermally insulated chambers (not depicted).

Example 2

Alternatively, a press like device can be used with two horizontal plates with coils inside that heat up (similar to a Panini press) that can reach a temp of 230° C. or 175° C. for 5 and 10 minutes, respectively, and thereby generating sheets of rubber.

Example 3

The obtained rubbers have a smooth appearance (absence of grooves and ridges on the surface), while being cut resistant (i.e., contact with standard instruments are unable to tear through the rubbers resulting from Compositions A-D) and resistant to dissolving and degradation (i.e., insoluble or poorly soluble in water and organic solvents, such as methanol, ethanol, acetone, acetonitrile, tetrahydrofuran (THF), 2-methyl THF, ethyl acetate, hexane, pentane, and diethyl ether). The smooth appearance, as depicted in insets of FIG. 6, persists even when exposed to UV/sunlight and harsh processing conditions (temperatures above 250° C. and high pressures) for 2-3 hours over a period of 5 months. Other properties of the rubber include high stability and shelf life by retaining a smooth and solid structure over time of greater than 1 year. Insets A, B, and C and D of FIG. 6 correspond to Composition A (which has a yellow appearance), Composition B (which has a brown appearance), Composition C (which has a yellow appearance) and Composition D (which has a brown appearance), respectively. The increased acrylate of Compositions A, B, and C counteracts the rigidity and intractability of glycerin, Xanthan, and ethyl cellulose, thereby yielding a tear resistant and stretchable, i.e., elastomeric material rubber. Compositions can be processed in the injection moldings, such as a thermoplastic (melted liquid), and then set to a particular expanded shape after heating and cooling.

Increased acrylate content of the rubber (as depicted in Inset A and Inset C of FIG. 6) have a yellow appearance, which contains acrylate, in comparison to rubber (as depicted in Inset B and Inset D of FIG. 6) having a brown appearance. The brown appearance rubbers (as depicted in Inset B and Inset D of FIG. 6) also have a harder and less elastic/stretchable property and a more water-resistant than the yellow appearance rubbers, which are more elastic and moldable with soft pressures (as depicted in Inset A and Inset C of FIG. 6). All four of the Insets in FIG. 6 correspond to rubber composition that have little or no odor to them.

The rubber corresponding to Compositions A, B, and C have a combined glycerin, Xanthan, and hydroxyethylcellulose content of 95%, 70%, and 57% by weight, respectively. In contrast to Composition D of a brown color, which has a combined glycerin, Xanthan, and hydroxyethylcellulose content of 100% by weight, Composition A of a yellow color includes 5% content of acrylate by weight in addition to the combined glycerin, Xanthan, and hydroxyethylcellulose content of 95% by weight. The addition of acrylate is imparting increased resistance to tearing and degradation at higher temperatures (>450° C.). The addition of aloe and stearyl alcohol to the combination of glycerin, Xanthan, and hydroxyethylcellulose imparts increased. The stearyl alcohol or other C8-C20 nonionic fatty alcohols in the compositions impart a more whitish color to the rubber, while increasing hardness and decreasing elasticity of the rubber. With the higher temperatures for processing and the pressure via the vacuum, rubbers corresponding to Composition D can become a very smooth, water resistant, cut-resistant, and stable for more than a year under ambient storage conditions (i.e., resistant to degradation while maintaining the smooth texture under ambient conditions).

Figure 6:
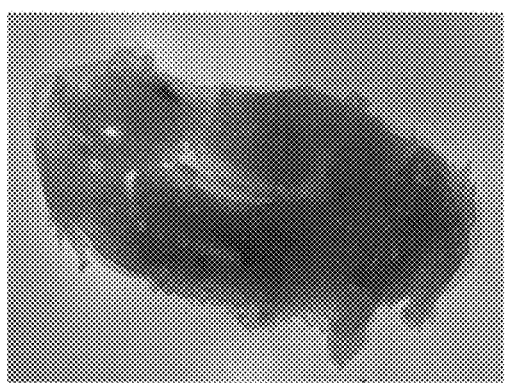
FIG. 6 and FIG. 7 are depictions of the rubber herein.
Figure 6:
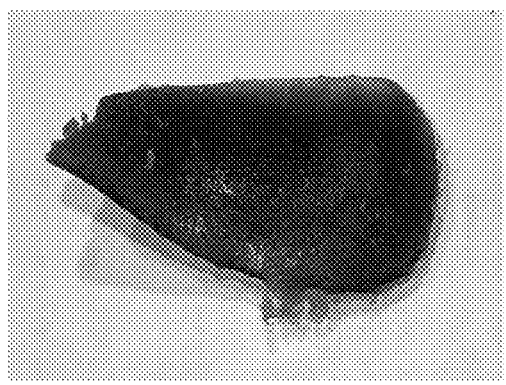
Figure 6:
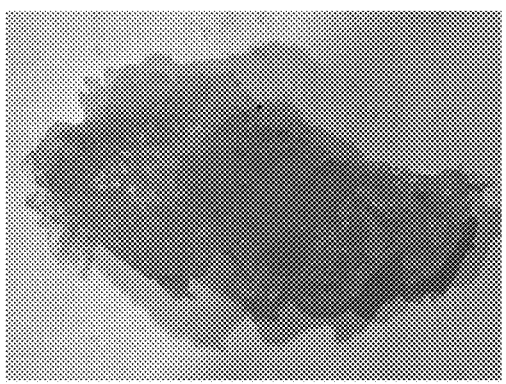
Figure 6:
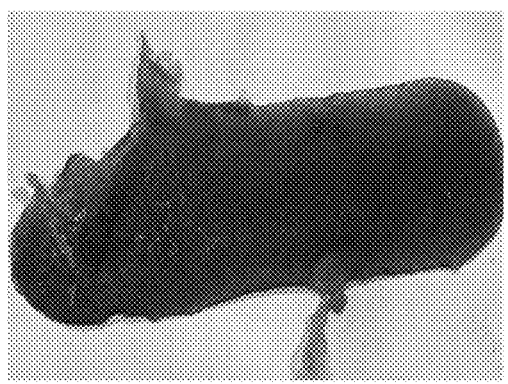
Figure 7:
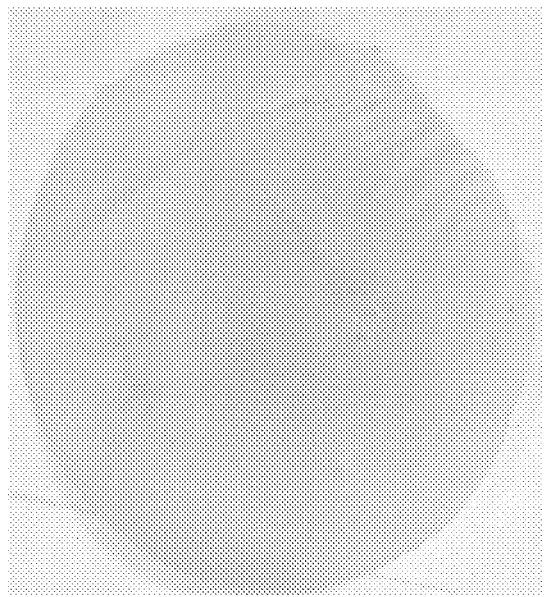
Figure 7:

Insets A and B of FIG. 7 are porous (via apertures) in contrast to the smooth texture of insets A, B, C, and D of FIG. 6. When the rubbers in FIG. 7 are stretched out and flattened using 50 pounds per square inch of pressure, the rubber as depicted in Inset A of FIG. 7 maintains homogeneity in the texture and is resistant to tearing, whereas the rubber as depicted in Inset B of FIG. 7 loses homogeneity in the texture and is more prone to tearing. Inset A in FIG. 7 is a depiction of a slightly porous rubber shape. The porous shape can be achieved by varying the increasing the ratio of non-fatty alcohols (e.g., stearyl alcohol to the other components in Composition B) and subjecting these components at the modified ratio to high pressure and temperature treatment and subsequent molding processes for longer periods of time than indicated above. The rubber molds in insets A and B in FIG. 7 contain porous features which can absorb water or other fluids. The slightly porous shape can be suitable for memory shape polymers (e.g., foams, scaffolds, and meshes). Alternatively, apertures can be punched through the sheets of rubbers corresponding to compositions A and C.

OTHER EMBODIMENTS

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which does not depart from the spirit or scope of the present inventive discovery. Such modifications are also intended to fall within the scope of the appended claims.

REFERENCES CITED

All publications, patents, patent applications and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

What is claimed is:

1. A composition, comprising:
 polyacrylate;
 polymethacrylate;
 a branched polysaccharide;
 a linear cellulose; and
 a solubilizer;
 wherein the polyacrylate, the polymethacrylate, the branched polysaccharide;
the linear cellulose, and the solubilizer are combined to form a rubber, wherein the rubber comprises pores.

2. The composition of claim 1, wherein the solubilizer comprises at least one of: glycerin and water.

3. The composition of claim 1, wherein the polyacrylate and polymethacrylate is Acrylate/C10-30 Alkyl Acrylate Crosspolymer.

4. The composition of claim 1, wherein the branched polysaccharide comprises at least one of: guar gum, xanthan gum, Carrageenan, and locust gum.

5. The composition of claim 1, wherein the linear cellulose comprises at least one of: hydroxylethylcellulose, hydroxymethylcellulose, and cellulose.

6. The composition of claim 1, wherein the polyacrylate and polymethacrylate are present in an amount of 5% by weight, the branched polysaccharide is present in amount of 10% by weight, the solubilizer is present in an amount of 70% by weight, the linear cellulose is present in an amount of 15% by weight.

7. The composition of claim 1, wherein the polyacrylate and polymethacrylate are present in an amount of 5% by weight, the branched polysaccharide is present in amount of 12% by weight, the solubilizer is present in an amount of 68% by weight, the linear cellulose is present in an amount of 15% by weight.

8. The composition of claim 1, wherein the rubber is processed from 85° C.-150° C.

9. A composition, comprising:
 polyacrylate;
 polymethacrylate;
 a branched polysaccharide;
 a linear cellulose; and
 a solubilizer;
 wherein the polyacrylate, the polymethacrylate, the branched polysaccharide; the linear cellulose, and the solubilizer are combined to form a rubber; wherein the polyacrylate and polymethacrylate are present in an amount of 5% by weight, the branched polysaccharide is present in amount of 10% by weight, the solubilizer is present in an amount of 70% by weight, the linear cellulose is present in an amount of 15% by weight.

10. A composition, comprising:
 polyacrylate; polymethacrylate;
 a branched polysaccharide;
 a linear cellulose; and
 a solubilizer;
 wherein the polyacrylate, the polymethacrylate, the branched polysaccharide; the linear cellulose, and the solubilizer are combined to form a rubber; wherein the polyacrylate and polymethacrylate are present in an amount of 5% by weight, the branched polysaccharide is present in amount of 12% by weight, the solubilizer is present in an amount of 68% by weight, the linear cellulose is present in an amount of 15% by weight.

* * * * *